(12) United States Patent
Walters et al.

(10) Patent No.: US 10,339,513 B1
(45) Date of Patent: Jul. 2, 2019

(54) CLOSED-LOOP TESTING OF INTEGRATED CIRCUIT CARD PAYMENT TERMINALS

(71) Applicant: Vantiv, LLC, Cincinnati, OH (US)

(72) Inventors: Patricia Lynn Walters, Phoenix, AZ (US); Steven Scott Cole, West Chester, OH (US)

(73) Assignee: Worldpay, LLC, Symmes Township, OH (US)

( * ) Notice: Subject to any disclaimer, the term of this patent is extended or adjusted under 35 U.S.C. 154(b) by 347 days.

(21) Appl. No.: 15/236,867

(22) Filed: Aug. 15, 2016

Related U.S. Application Data (63) Continuation of application No. 14/732,921, filed on Jun. 8, 2015, now Pat. No. 9,449,320.

(51) Int. Cl.
*G06Q 20/00* (2012.01)
*G06Q 20/20* (2012.01)
*G06Q 20/40* (2012.01)

(52) U.S. Cl.
CPC .......... *G06Q 20/202* (2013.01); *G06Q 20/40* (2013.01)

(58) Field of Classification Search
CPC ..................................................... G01R 31/02
USPC .......................................................... 705/21
See application file for complete search history.

(56) References Cited

U.S. PATENT DOCUMENTS

| | | | |
|---|---|---|---|
| 5,594,694 A * | 1/1997 | Roohparvar | G11C 16/26 365/185.21 |
| 5,818,251 A * | 10/1998 | Intrater | G01R 31/2812 324/750.3 |
| 6,327,678 B1 * | 12/2001 | Nagai | G01R 31/31725 714/700 |
| 6,450,407 B1 * | 9/2002 | Freeman | G06K 19/0723 235/376 |
| 6,615,390 B1 * | 9/2003 | Takagi | G06K 19/077 257/E23.176 |
| 6,714,979 B1 | 3/2004 | Brandt | |
| 7,080,049 B2 * | 7/2006 | Truitt | G06Q 20/16 380/30 |
| 7,225,249 B1 | 5/2007 | Barry | |
| 7,290,278 B2 | 10/2007 | Cahill | |
| 7,527,194 B2 | 5/2009 | Truitt | |
| 8,554,631 B1 | 10/2013 | Barton | |
| 9,449,320 B1 * | 9/2016 | Walters | G06Q 20/40 |
| 10,012,576 B2 * | 7/2018 | Zhao | G01N 3/08 |
| 2002/0174013 A1 * | 11/2002 | Freeman | G06K 19/0723 705/14.66 |
| 2003/0065931 A1 | 4/2003 | Nakai | |
| 2004/0210776 A1 | 10/2004 | Shah | |
| 2005/0080581 A1 | 4/2005 | Zimmerman | |
| 2006/0219775 A1 * | 10/2006 | Truitt | G06Q 20/16 235/380 |
| 2007/0199985 A9 * | 8/2007 | Truitt | G06Q 20/16 235/380 |

(Continued)

*Primary Examiner* — Oluseye Iwarere
(74) *Attorney, Agent, or Firm* — Bookoff McAndrews, PLLC (57) ABSTRACT

Technologies for closed-looped testing of integrated circuit card payment terminals include loading a test profile onto an integrated circuit payment card. Authorization request and response messages are locally generated and translated to simulate acquirer processor processing and payment network processing. An outcome report indicative of the outcome of the test transaction is generated and transmitted to a remote certification server. Other embodiments are described and claimed.

18 Claims, 4 Drawing Sheets

(56) References Cited

U.S. PATENT DOCUMENTS

| | | |
|---|---|---|
| 2007/0282743 A1 | 12/2007 | Lovelett |
| 2009/0079419 A1 | 3/2009 | Lui |
| 2009/0182654 A1 | 7/2009 | Mullen |
| 2010/0174620 A1 | 7/2010 | Stringfellow |
| 2012/0011067 A1 | 1/2012 | Katzin |
| 2012/0278205 A1 | 11/2012 | Chin |
| 2013/0067216 A1* | 3/2013 | Tanner ................ H04L 9/3234 713/155 |
| 2013/0212025 A1 | 8/2013 | Tanner |
| 2014/0201076 A1 | 7/2014 | Pacher |
| 2015/0026067 A1 | 1/2015 | Abifaker |
| 2015/0227923 A1 | 8/2015 | Kutsch |
| 2015/0235212 A1 | 8/2015 | Ortiz |
| 2017/0013121 A1* | 1/2017 | Baeder ................ H04M 3/00 |

\* cited by examiner

CLOSED-LOOP TESTING OF INTEGRATED CIRCUIT CARD PAYMENT TERMINALS

This application is a continuation of copending U.S. application Ser. No. 14/732,921, filed on Jun. 8, 2015, which is herein incorporated by reference in its entirety.

TECHNICAL FIELD

Embodiments of the technologies described herein relate, in general, to the field of payment terminal certification testing. More particularly, the technologies described herein relate to the field of testing and certification of integrated circuit card payment terminals in a closed-loop environment.

BACKGROUND

Financial institutions are increasingly providing customers with integrated circuit cards for credit and debit transactions instead of traditional cards containing magnetic stripes (e.g., magstripes, swipe cards, etc.). Such integrated circuit cards provide additional functionality relating to payment and debit transactions over that which is provided by traditional magnetic stripe cards. Additionally, integrated circuit cards include increased security functionality to assist in reducing instances of fraud in credit and debit transactions. In order to ensure that integrated circuit cards and card readers are secure and comply with integrated circuit card transaction standards, such cards and readers are required to be certified by one or more accredited testing entities (e.g., an acquirer processor, a payment network, etc.). Such certification requires merchants to generate and submit a test transaction to the testing entities for each type of credit or debit transaction that may later be performed by the merchant. Once the testing entities are satisfied that the merchant's test transactions comply with the applicable integrated circuit card transaction standards, the merchant can be certified.

SUMMARY

In an embodiment, the present disclosure is directed, in part, to a method for closed-looped testing of integrated circuit card payment terminals, the method includes loading, by a card and simulation server of a first environment, a test profile onto an integrated circuit payment card. The method further includes receiving, by the card and simulation server and from a merchant transaction server of the first environment, a first authorization request message in a first message format for a test transaction based on the test profile. Additionally, the method includes translating, by the card and simulation server, the first authorization request message in the first message format into a second authorization request message in a second message format and generating, by the card and simulation server, a first authorization response message for the test transaction in the second message format based on the second authorization request message in the second message format and the test profile. The method also includes translating, by the card and simulation server, the first authorization response message in the second message format into a second authorization response message in the first message format, and transmitting, by the card and simulation server, the second authorization response message in the first message format to the merchant transaction server of the first environment.

In another embodiment, the present disclosure is directed, in part, to one or more machine-readable storage media including a plurality of instructions stored thereon that in response to being executed by a card and simulation server of a first environment, cause the card and simulation server to load a test profile onto an integrated circuit payment card and, receive, from a merchant transaction server of the first environment, a first authorization request message in a first message format for a test transaction based on the test profile. The plurality of instructions further cause the card and simulation server to translate the first authorization request message in the first message format into a second authorization request message in a second message format. Additionally, the plurality of instructions further cause the card and simulation server to generate a first authorization response message for the test transaction in the second message format based on the second authorization request message in the second message format and the test profile. The plurality of instructions further cause the card and simulation server to translate the first authorization response message in the second message format into a second authorization response message in the first message format, and transmit the second authorization response message in the first message format to the merchant transaction server of the first environment.

In another embodiment, the present disclosure is directed, in part, to a closed-loop system for testing integrated circuit card payment terminals, the closed-loop system includes a card and simulation server of a first environment having a processor executing instructions stored in memory, wherein the instructions cause the processor to load a test profile onto an integrated circuit payment card, and receive, from a merchant transaction server of the first environment, a first authorization request message in a first message format for a test transaction based on the test profile. The instructions further cause the processor of the card and simulation server to translate the first authorization request message in the first message format into a second authorization request message in a second message format. Additionally, the instructions cause the processor of the card and simulation server to generate a first authorization response message for the test transaction in the second message format based on the second authorization request message in the second message format and the test profile. The instructions also cause the processor of the card and simulation server to translate the first authorization response message in the second message format into a second authorization response message in the first message format, and transmit the second authorization response message in the first message format to the merchant transaction server of the first environment.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle" or a "payment card device," which generally refers to any type of financial alternative to currency. As is to be clear to those skilled in the art, no aspect of the present disclosure is specifically limited to a specific type of payment vehicle or payment card device. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like. Payment vehicles or payment card devices can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument.

Figure 1:
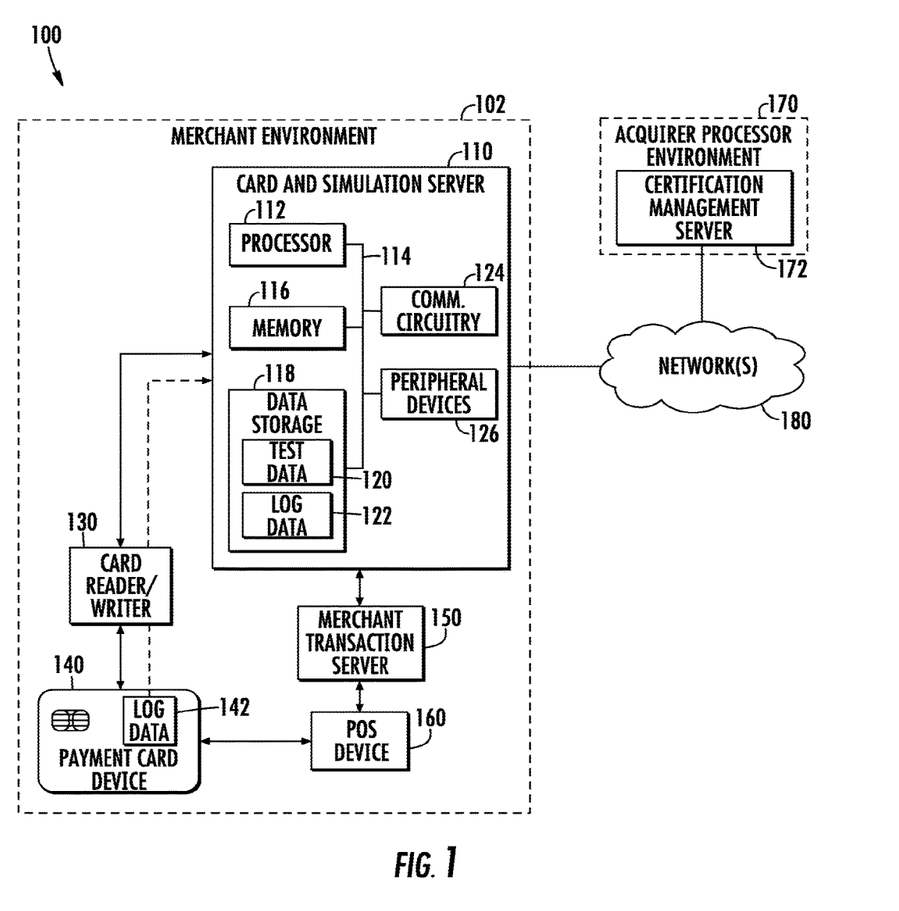
FIG. 1 is a simplified block diagram of at least one embodiment of a system for closed-loop testing of integrated circuit card payment terminals.

Referring now to FIG. 1, in one embodiment, a system 100 for closed-loop testing of terminals configured to process transactions from integrated circuit payment cards includes a merchant environment 102 having a card and simulation server 110, a card reader/writer 130, a payment card device 140, a merchant transaction server 150, and a point-of-sale (POS) device 160 (e.g., a payment terminal). In the illustrative embodiment, the payment card device 140 includes an integrated circuit chip. For example, in some embodiments, the payment card device 140 can be embodied as a EUROPAY, MASTERCARD, AND VISA (EMV) payment card. In operation, the card and simulation server 110 locally simulates and/or emulates messaging and transaction processing conventionally provided by devices of remote acquirer processors and payment networks. To do so, the card and simulation server 110 transmits a test profile to a payment card device 140. The payment card device 140, or at least the integrated circuit portion thereof, is inserted into or placed in close proximity to the POS device 160 during a test transaction. The POS device 160 transmits payment data associated with the test transaction and data associated with the payment card device 140 to the merchant transaction server 150. The merchant transaction server 150 generates an authorization request message for the test transaction and transmits the message to the card and simulation server 110.

As discussed, the card and simulation server 110 simulates and/or emulates messaging and transaction processing conventionally provided by devices of remote acquirer processors and payment networks. For example, in the illustrative embodiment, the card and simulation server 110 translates the authorization request message from a message formatted according to an acquirer processor messaging specification to a message formatted according to a payment network messaging specification. The card and simulation server 110 then applies payment processing logic to the translated authorization request message to generate an appropriate payment network response (i.e., an authorization response message). Since the card and simulation server 110 is simulating and/or emulating the messaging and transaction processing conventionally provided by devices of a payment network, the authorization response message generated by the card and simulation server 110 is formatted according to the corresponding payment network messaging specification. Thereafter, the card and simulation server 110 translates the generated authorization response message from a message formatted according to the payment network specification to a message formatted according to the acquirer processor messaging specification. The card and simulation server 110 then transmits the translated authorization response message to the merchant transaction server 150.

Additionally, in the illustrative embodiment, the payment card device 140 is configured to capture and locally store log data 142 (e.g., transaction data, test data, etc.) associated with the test transaction. The log data 142 locally stored by the payment card device 140 can be transmitted to the card and simulation server 110 for further analysis. In some embodiments, the log data 142 is transmitted to the card and simulation server 110 via the card reader/writer 130. The card and simulation server 110 then analyzes the log data 142 and, in some embodiments, local log data 122 to determine an outcome of the test transaction. An outcome report based on the results of the test transaction can be generated by the card and simulation server 110, in some embodiments. Additionally, in some embodiments, the determined outcome and/or the outcome report can be transmitted to the certification management server 172 of the acquirer processor environment 170 for further analysis. It should be appreciated that test transactions and the results thereof can be used to test and certify a merchant payment terminal (e.g., the POS device 160), which can be configured to process integrated circuit card payment transactions.

As discussed, the merchant environment 102 includes the card and simulation server 110, card reader/writer 130, payment card device 140, merchant transaction server 150, and point-of-sale (POS) device 160. It should be appreciated that the merchant environment 102 can also include any other device that facilitates credit or debit transactions. As discussed in more detail below, certification testing for integrated circuit card-capable POS devices or terminals (e.g., the POS device 160) can be performed locally by one or more of the devices of the merchant environment 102. As such, devices of a remote environment (e.g., the acquirer processor environment 170, a payment network environment, etc.) are not required for certification testing.

The card and simulation server 110 can be embodied as any type of server or computing device capable of processing, communicating, storing, maintaining, and transferring data. For example, the card and simulation server 110 can be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the card and simulation server 110 can be embodied as a computing device integrated with other systems or subsystems. In the illustrative embodiment of FIG. 1, the card and simulation server 110 includes a processor 112, a system bus 114, a memory 116, a data storage 118, communication circuitry 124, and one or more peripheral devices 126. Of course, the card and simulation server 110 can include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 116, or portions thereof, can be incorporated in the processor 112 in some embodiments. Furthermore, it should be appreciated that the card and simulation server 110 can include other components, sub-components, and devices commonly found in a computer and/or computing device, which are not illustrated in FIG. 1 for clarity of the description.

The processor 112 can be embodied as any type of processor capable of performing the functions described herein. For example, the processor 112 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the card and simulation server 110 includes a system bus 114 for interconnecting the various components of the card and simulation server 110. The system bus 114 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 112, the memory 116, and other components of the card and simulation server 110. In some embodiments, the card and simulation server 110 can be integrated into one or more chips such as a programmable logic device or an application specific integrated circuit (ASIC). In such embodiments, the system bus 114 can form a portion of a system-on-a-chip (SoC) and be incorporated, along with the processor 112, the memory 116, and other components of the card and simulation server 110, on a single integrated circuit chip.

The memory 116 can be embodied as any type of volatile or non-volatile memory or data storage capable of performing the functions described herein. For example, the memory 116 can be embodied as read only memory (ROM), random access memory (RAM), cache memory associated with the processor 112, or other memories such as dynamic RAM (DRAM), static ram (SRAM), programmable ROM (PROM), electrically erasable PROM (EEPROM), flash memory, a removable memory card or disk, a solid state drive, and so forth. In operation, the memory 116 can store various data and software used during operation of the card and simulation server 110 such as operating systems, applications, programs, libraries, and drivers.

The data storage 118 can be embodied as any type of device or devices configured for short-term or long-term storage of data such as, for example, memory devices and circuits, memory cards, hard disk drives, solid-state drives, or other data storage devices. For example, in some embodiments, the data storage 118 includes storage media such as a storage device that can be configured to have multiple modules, such as magnetic disk drives, floppy drives, tape drives, hard drives, optical drives and media, magneto-optical drives and media, compact disc drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 112, or the memory 116 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

In some embodiments, the data storage 118 includes test data 120, which can be embodied as one or more test profiles. Each test profile can include one or more test parameters or requirements (e.g., transaction amount, transaction type, payment card characteristics, etc.) that define a test transaction to be performed for a particular test scenario. As discussed in more detail below, a test transaction can be locally processed by the card and simulation server 110 based at least in part on, or otherwise as a function of, the corresponding test profile. The results or outcome of the test transaction can be analyzed by the card and simulation server 110 and a report can be generated. Based on the outcome of the test transaction, it can be determined whether the particular test scenario was a success or a failure. In some embodiments, the test profiles (e.g., the test data 120) can also include one or more applications to be executed by the payment card device 140. In such embodiments, the application(s) can be loaded onto the payment card device 140 and can be configured to facilitate the initialization of a test transaction and/or facilitate the capture and local storage of log data 142.

Additionally, the data storage 118 can include log data 122. The log data 122 can be locally captured by the card and simulation server 110 during processing of a test transaction. In some embodiments, the log data 122 includes transaction data (e.g., authorization request messages, authorization response messages, timestamps, bitmapped data fields, test results, etc.) generated locally by the card and simulation server 110. Additionally or alternatively, the log data 122 can include other types of data generated by other devices of the merchant environment 102 (e.g., the card reader/writer 130, payment card device 140, merchant transaction server 150, POS device 160, etc.).

The communication circuitry 124 of the card and simulation server 110 may be embodied as any type of communication circuit, device, interface, or collection thereof, capable of enabling communications between the card and simulation server 110 and the card reader/writer 130, payment card device 140, merchant transaction server 150, merchant POS device 160, certification management server 172, and/or any other computing device communicatively coupled thereto. For example, the communication circuitry 124 may be embodied as one or more network interface controllers (NICs), in some embodiments. The communication circuitry 124 may be configured to use any one or more communication technologies (e.g., wireless or wired communications) and associated protocols (e.g., Ethernet, Wi-Fi®, WiMAX, etc.) to effect such communication.

In some embodiments, the card and simulation server 110, card reader/writer 130, payment card device 140, merchant transaction server 150, merchant POS device 160, certification management server 172, and/or any other computing devices of the system 100, can communicate with each other over one or more networks 180. The network(s) 180 can be embodied as any number of various wired and/or wireless communication networks. For example, the network(s) 180 can be embodied as or otherwise include a local area network (LAN), a wide area network (WAN), a cellular network, or a publicly-accessible, global network such as the Internet. Additionally, the network(s) 180 can include any number of additional devices to facilitate communication between the computing devices of the system 100.

Additionally, in some embodiments, the card and simulation server 110 can further include one or more peripheral devices 126. Such peripheral devices 126 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

The card reader/writer 130 can be embodied as any type of computing device capable of performing the functions described herein. As such, the card reader/writer 130 can include devices and structures commonly found in computing devices such as processors, memory devices, communication circuitry, and data storages, which are not shown in FIG. 1 for clarity of the description. In some embodiments, the card reader/writer 130 is configured to transmit test profile(s) to the payment card device 140 in response to the payment card device 140 being placed into contact with, or in close proximity to, the card reader/writer 130. Additionally, the card reader/writer 130 is configured to receive, from the payment card device 140, log data 142 (e.g., transaction data, test data, etc.) corresponding to a test transaction.

The payment card device 140 can be embodied as any type of payment card or payment vehicle issued to an account holder by an issuer financial institution. In some embodiments, the payment card device 140 can be used to locally test transactions and devices within the merchant environment 102. The payment card device 140 includes an integrated circuit chip and/or other electronic circuitry that is printed or otherwise incorporated onto or within the payment card device 140. The integrated circuit chip and/or circuitry is configured to generate and manage and payment and/or transaction data (e.g., bitmaps, payment card rules, transaction messaging, authentication, encryption, logging, etc.). As such, the payment card device 140 and/or integrated circuit chip and/or circuitry included therein can include devices and structures commonly found in computing devices such as processors, memory devices, communication circuitry, and data storages, which are not shown in FIG. 1 for clarity of the description. In embodiments in which the payment card device 140 includes an integrated circuit chip, the payment card device 140 can be embodied as a EUROPAY, MASTERCARD, AND VISA (EMV) payment card device. It should be appreciated that, in other embodiments, the payment card device 140 can be embodied as any other type of smart card, chip card, or integrated circuit card. Additionally, in some embodiments, the payment card device 140 can also include a magnetic stripe, which can include encoded payment card data.

The merchant transaction server 150 can be embodied as any type of computing device capable of performing the functions described herein. As such, the merchant transaction server 150 can include devices and structures commonly found in computing devices such as processors, memory devices, communication circuitry, and data storages, which are not shown in FIG. 1 for clarity of the description. In some embodiments, the merchant transaction server 150 is configured to initiate test transactions based on one or more test profiles. For example, in some embodiments, the merchant transaction server 150 is configured to generate or receive a transaction amount corresponding to a test transaction. The merchant transaction server 150 is also configured to communicate with the POS device 160 during the test transaction. For example, during the initial stages of a test transaction, the merchant transaction server 150 may receive payment data (e.g., payment card number, BIN number, expiration data, EMV data, transaction amount, merchant data, identification data, etc.) from the POS device 160 in response to the payment card device 140 being placed in contact with, or close proximity to, the POS device 160. Additionally, the merchant transaction server 150 can be configured to transmit transaction-related data (e.g., authorization request messages, authorization response messages, timestamps, bitmapped data fields, test results, etc.) to the POS device 160 during subsequent stages of the test transaction. The merchant transaction server 150 can also be configured to generate payment messages for the test transaction. For example, in some embodiments, the merchant transaction server 150 is configured to generate an authorization request message and receive an authorization response message for the test transaction.

The POS device 160 can be embodied as a payment terminal or any type of computing or payment device capable of performing the functions described herein. For example, in the illustrative embodiment, the POS device 160 can facilitate receipt of the payment card device 140 for a credit or debit transaction. Such credit and debit transactions can be embodied as test transactions, or they can be embodied as actual financial transactions. The POS device 160 can include devices and structures commonly found in computing and payment devices such as processors, memory devices, communication circuitry, and data storages, which are not shown in FIG. 1 for clarity of the description. In some embodiments, the POS device 160 includes one or more integrated circuit card interfaces (not shown) configured to transmit and receive card-specific data (e.g., payment card number, BIN number, expiration data, EMV data, etc.) and/or transaction-specific data (e.g., transaction amount, merchant data, identification data, etc.) to/from the payment card device 140. It should be appreciated that although the POS device 160 and the merchant transaction server 150 are shown as being separate in the illustrative embodiment, the POS device 160 and the merchant transaction server 150 can be combined to form a single payment transaction device, in other embodiments. For example, in some embodiments, the merchant transaction server 150 can be incorporated within the POS device 160. Likewise, the POS device 160 can be incorporated within the merchant transaction server 150. In other embodiments, both the merchant transaction server 150 and the POS device 160 can be incorporated in a different payment device (not shown) of the system 100.

The certification management server 172 of the acquirer processor environment 170 can be embodied as any type of computing device capable of performing the functions described herein. As such, the certification management server 172 can include devices and structures commonly found in computing devices such as processors, memory devices, communication circuitry, and data storages, which are not shown in FIG. 1 for clarity of the description. In some embodiments, determined outcome(s) and/or outcome report(s) can be received by the certification management server 172 of the acquirer processor environment 170 for additional analysis. In such embodiments, the additional analysis can be used to verify or certify a merchant's processing of integrated circuit cards (e.g., the payment card device 140) and/or the merchant's POS device(s) 160.

In some embodiments, the card and simulation server 110, card reader/writer 130, payment card device 140, merchant transaction server 150, POS device 160, and certification management server 172 can each establish an environment during operation. Each environment can include various modules, components, sub-components, and devices commonly found in computing devices, which are not illustrated in the figures for clarity of the description. The various modules, components, sub-components, and devices of each environment can be embodied as hardware, firmware, software, or a combination thereof. For example, one or more of the modules, components, sub-components, and devices of each environment can be embodied as a processor and/or a controller configured to provide the functionality described below.

Figure 2:
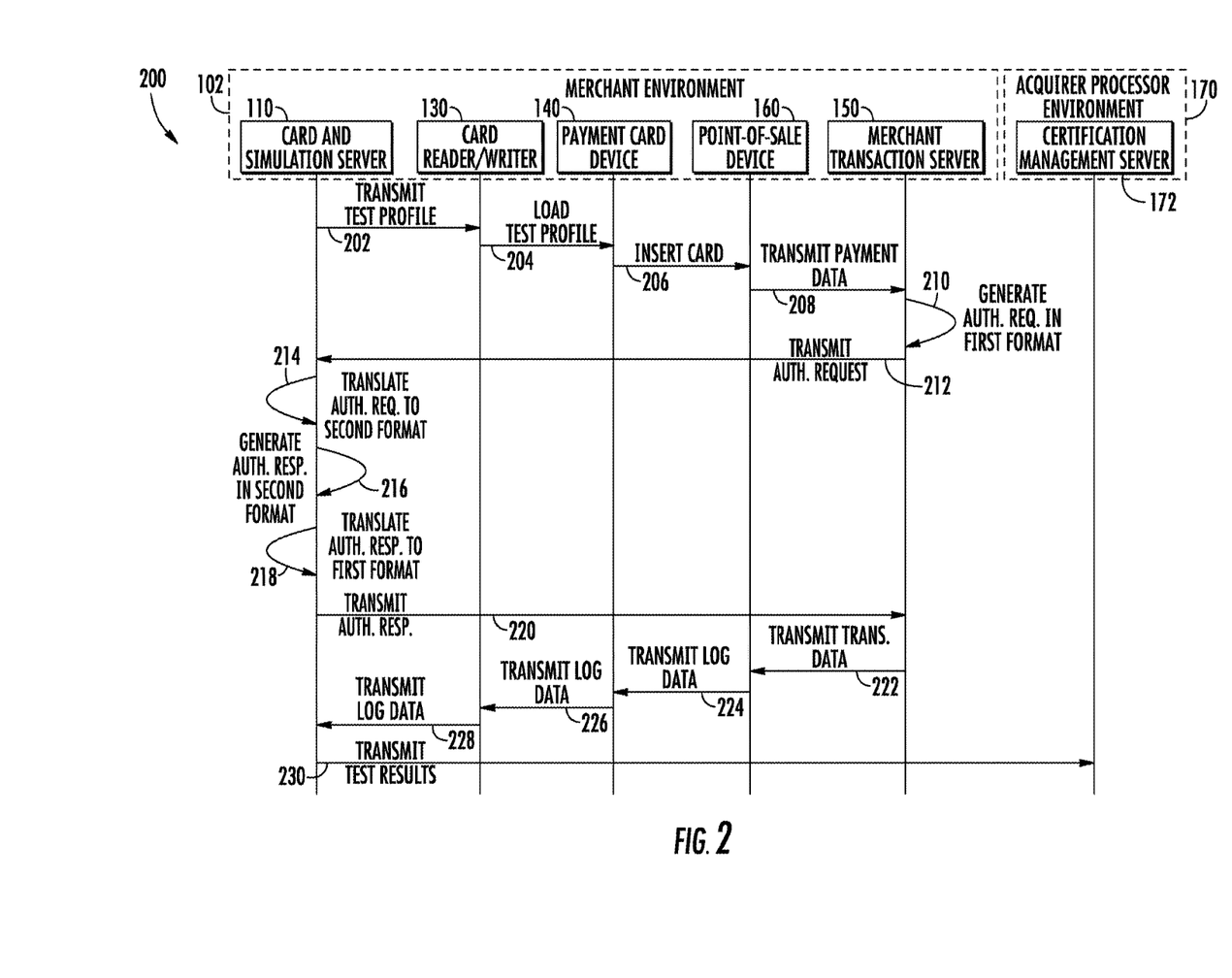
FIG. 2 is a simplified sequence flow diagram in accordance with at least one non-limiting embodiment.

Referring now to FIG. 2, a process 200 that may be executed by the devices of the merchant environment 102 and the devices of the acquirer processor environment 170 begins with process flow 202. In process flow 202, the card and simulation server 110 transmits a test profile to the card reader/writer 130. Subsequently, in process flow 204, the card reader/writer 130 loads the received test profile onto the payment card device 140. To do so, in some embodiments, the card reader/writer 130 wirelessly transmits the test profile to the payment card device 140 in response to the payment card device 140 being placed in contact with, or in close proximity to, the card reader/writer 130. Thereafter, a test transaction based at least in part on, or otherwise as a function of, the test profile can be initiated. In process flow 206, the payment card device 140, or at least the integrated circuit portion thereof, is then inserted into or placed in close proximity to the POS device 160.

Next, in process flow 208, payment data for the test transaction is transmitted by the POS device 160 to the merchant transaction server 150. The payment data can be embodied as card-specific data (e.g., payment card number, BIN number, expiration data, EMV data, etc.), transaction-specific data (e.g., transaction amount, merchant data, identification data, etc.), or any other type of data related to the test transaction. In some embodiments, the POS device 160 transmits the payment data to the merchant transaction server 150 in response to the payment card device 140 being placed in contact with, or within close proximity to, the POS device 160. For example, in embodiments in which the payment card device 140 is embodied as an EMV payment card device 140, the EMV payment card device 140 can transmit the payment data in response to an integrated circuit of the EMV payment card device 140 being placed within an EMV interface of the POS device 160.

In process flow 210, in response to receiving the payment data from the POS device 160, the merchant transaction server 150 generates an authorization request message. The authorization request message can be formatted according to an acquirer processor messaging specification. The acquirer processor messaging specification can be embodied as a proprietary or customized messaging specification, an industry standard messaging specification, or a hybrid thereof. As such, in some embodiments, the authorization request message can be formatted according to the ISO 8583 messaging specification or a customized version of the ISO 8583 messaging specification. Subsequently, in process flow 212, the merchant transaction server 150 transmits the generated authorization request message to the card and simulation server 110.

In process flow 214, the card and simulation server 110 translates (e.g., converts, formats, etc.) the received authorization request message from a message formatted according to one messaging standard to a message formatted according to another messaging standard. For example, in the illustrative embodiment, the card and simulation server 110 translates the received authorization request message from a message formatted according to the acquirer processor messaging specification to a message formatted according to a payment network messaging specification. In doing so, the card and simulation server 110 emulates and/or simulates processing and messaging features conventionally provided by an acquirer processor.

In process flow 216, the card and simulation server 110 generates an authorization response message based at least in part on, or otherwise as a function of, the authorization request message received by the merchant transaction server 150 and translated into a message formatted according to the payment network messaging specification. To do so, the card and simulation server 110 can apply payment processing logic to the translated authorization request message and generate an appropriate payment network response (i.e., the authorization response message). In the illustrative embodiment, the card and simulation server 110 locally applies the payment processing logic to the translated authorization request message without requiring processing by devices of a remote payment network. In doing so, the card and simulation server 110 locally simulates and/or emulates processing and messaging features conventionally provided by a payment network. It should be appreciated that the authorization response message generated by the card and simulation server 110 can be in the same or a substantially similar format as the translated authorization request message. For example, the generated authorization response message can be embodied as a message formatted according to a payment network messaging specification.

Additionally, in some embodiments, the authorization response message can be generated by the card and simulation server 110 based at least in part on, or otherwise as a function of, the test profile loaded onto the payment card device 140. For example, in some embodiments, the test profile can include one or more test parameters (e.g., transaction amount, transaction type, payment card characteristics, etc.) or requirements that define the test transaction to be performed for a particular test scenario. As such, the content (e.g., messages, response codes, etc.) of the authorization response message may be based on the test parameters that define the test transaction for the particular test scenario.

Next, in process flow 218, the card and simulation server 110 translates (e.g., converts, formats, etc.) the generated authorization response message from a message formatted according to one messaging standard to a message formatted according to another messaging standard. For example, in the illustrative embodiment, the card and simulation server 110 translates the generated authorization response message from a message formatted according to the payment network messaging specification into a message formatted according the acquirer processor messaging specification, which as discussed above, is also the message format of the originally received authorization request message. In doing so, the card and simulation server 110 again emulates and/or simulates processing and messaging features conventionally provided by an acquirer processor. Subsequently, in process flow 220, the card and simulation server 110 transmits the translated authorization response message to the merchant transaction server 150 for further processing.

In process flow 222, the merchant transaction server 150 transmits transaction data to the POS device 160. The transaction data can include, for example, authorization request messages, authorization response messages, timestamps, bitmapped data fields, test results, or any other type of data relating to the test transaction or the processing thereof. In some embodiments, the transaction data can be generated by the merchant transaction server 150 based on the authorization request and response messages generated and received for the test transaction. Additionally or alternatively, at least a portion of the transaction data can be generated by the card and simulation server 110 while the test transaction is being locally processed. It should be appreciated that the transaction data can also be generated by any other device of the merchant environment 102.

In process flow 224, the POS device 160 transmits log data to the payment card device 140. In some embodiments, the log data includes the transaction data received from the merchant transaction server 150. It should be appreciated that the log data transmitted to the payment card device 140 can include any other type of data relating to the test transaction or the processing thereof. Additionally, in some embodiments, the log data transmitted by the POS device 160 can be stored in a local storage of the payment card device 140.

In process flow 226, the payment card device 140 transmits log data 142 to the card reader/writer 130 in response to the payment card device 140 being placed into contact with, or in close proximity to, the card reader/writer 130. In some embodiments, the log data 142 includes the log data received from the POS device 160. Additionally or alternatively, the log data 142 includes transaction data or test data captured and stored locally by the payment card device 140. For example, in some embodiments, the test profile loaded onto the payment card device 140 includes one or more applications configured to be executed by a processor or processing logic of the payment card device 140. In such embodiments, the application(s) can be configured to cause the payment card device 140 to capture and store the log data 142 (e.g., transaction data, test results, etc.) during the test transaction.

In process flow 228, the card reader/writer 130 transmits the log data 142 received from the payment card device 140 to the card and simulation server 110 for analysis. For example, in some embodiments, the card and simulation server 110 determines an outcome (e.g., pass, fail, etc.) of the test transaction based on the received log data 142 and one or more test parameters (e.g., transaction amount, transaction type, payment card characteristics, etc.) that define the test transaction performed for a particular test scenario. Additionally, in some embodiments, the card and simulation server 110 can also capture log data 122 (e.g., transaction data, test data, etc.) corresponding to the test transaction. In such embodiments, the card and simulation server 110 can also analyze the locally captured log data 122 when determining the outcome of the test transaction.

Subsequently, in process flow 230, the card and simulation server 110 transmits the test results to the certification management server 172 of the acquirer processor environment 170. The test results can be in the format of an outcome report generated by the card and simulation server 110 from the determined outcome of the test transaction. The test results and/or the outcome report can be used to facilitate closed-loop testing and certification of the POS device 160 (e.g., a payment terminal), the merchant transaction server 150, or any other device of the merchant environment 102. For example, in embodiments in which the payment card device 140 is embodied as an EMV payment card device 140 and the POS device 160 includes an EMV interface, the POS device 160 may be locally tested and certified without requiring communication with, or processing by, devices of an acquirer processor or a payment network.

Figure 3:
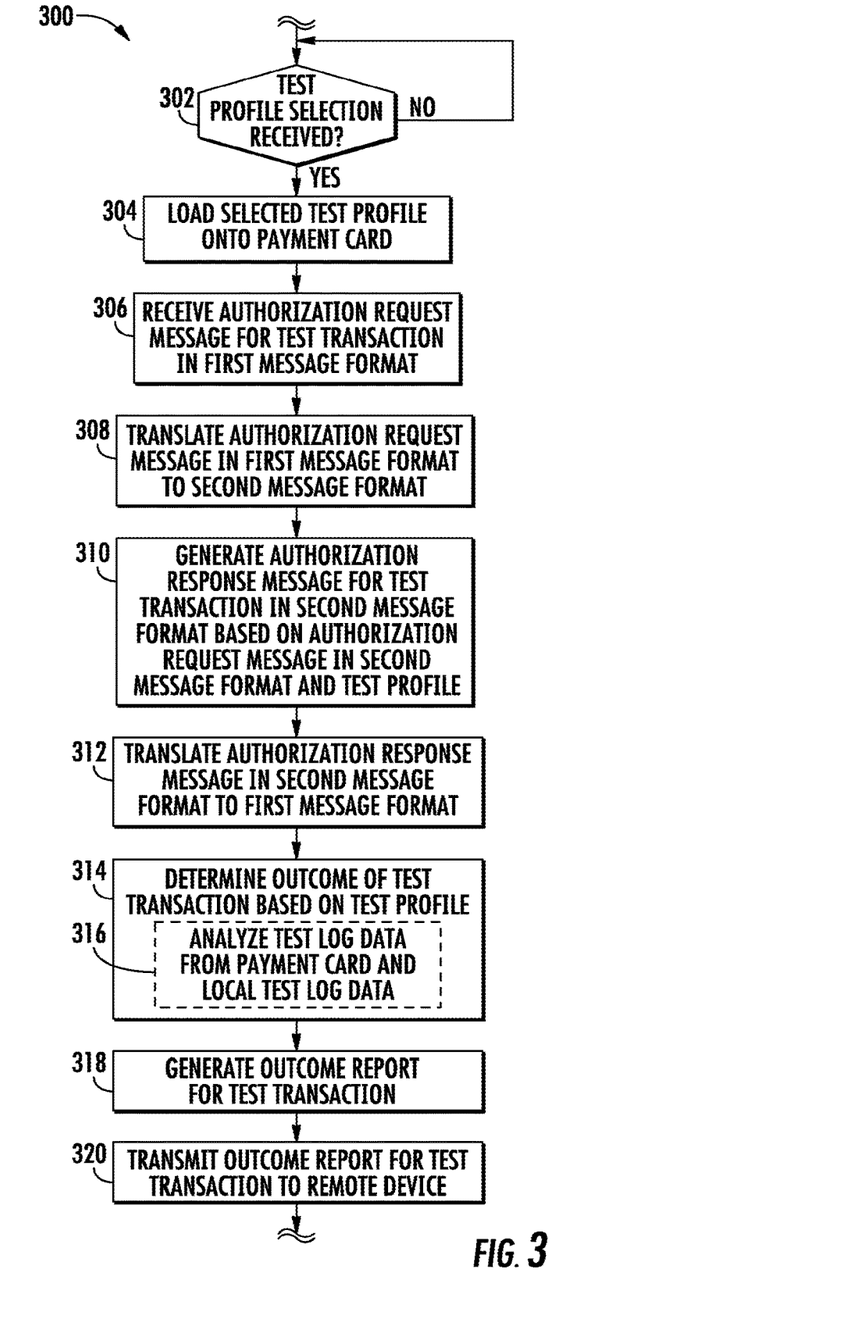
FIG. 3 is a simplified flow diagram of at least one embodiment of a method that may be executed by the card and simulation server of FIG. 1 for testing integrated circuit card payment terminals in a closed-loop environment.

Referring now to FIG. 3, a method 300 that may be executed by the card and simulation server 110 for testing integrated circuit card payment terminals in a closed-loop environment begins with decision block 302. In decision block 302, the card and simulation server 110 determines whether a selection of a test profile is received. In some embodiments, a test profile selection may be received from an input device of the card and simulation server 110. In other embodiments, a test profile selection may be received from another device of the merchant environment 102 such as, for example, the card reader/writer 130, the merchant transaction server 150, and/or the point-of-sale device 160. If, in decision block 302, the card and simulation server 110 determines that a test profile selection is received, the method 300 advances to block 304. If, however, the card and simulation server 110 determines instead that a test profile selection is not received, the method 300 loops back to decision block 302 and the card and simulation server 110 continues monitoring for receipt of a test profile selection.

In block 304, the card and simulation server 110 loads the selected test profile onto the payment card device 140. To do so, in some embodiments, the card and simulation server 110 can transmit the selected test profile to the card reader/writer 130, which can be configured to load the selected test profile onto the payment card device 140. In such embodiments, the selected test profile can be loaded onto the payment card device 140 in response to the payment card device 140 being placed in contact with, or close proximity to, the card reader/writer 130. In other embodiments, the card and simulation server 110 may load the selected test profile directly onto the payment card device 140 via the card reader/writer 130, which may be embodied as one of the peripheral devices 126 of the card and simulation server 110. In either case, the selected test profile, or a portion thereof, can be loaded into a local storage device of the payment card device 140. As discussed, in some embodiments, the selected test profile can include one or more programs or applications that when executed by the processor of the payment card device 140, facilitate testing one or more transactions between devices of the merchant environment 102 (e.g., the POS device 160, the merchant transaction server 150, the card and simulation server 110, etc.) and one or more devices of the acquirer processor environment 170 and/or payment networks (not shown).

In block 306, the card and simulation server 110 receives an authorization request message. The authorization request message can be associated with a test transaction that corresponds to the test profile loaded onto the payment card 140. In the illustrative embodiment, the authorization request message can be generated by and received from the merchant transaction server 150. In some embodiments, the received authorization request message can be formatted according to an acquirer processor messaging specification. In such embodiments, the acquirer processor messaging specification can be embodied as a proprietary or customized messaging specification, an industry standard messaging specification, or a hybrid thereof. For example, in some embodiments, the received authorization request message can be formatted according to the ISO 8583 messaging specification or a customized version of the ISO 8583 messaging specification.

In block 308, the card and simulation server 110 translates the authorization request message from a message formatted according to one messaging standard to a message formatted according to another messaging standard. For example, the card and simulation server 110 can translate the authorization request message from a message formatted according to the acquirer processor messaging standard to a message formatted according to a payment network messaging standard. It should be appreciated that by doing so, the card and simulation server 110 can locally simulate and/or emulate processing by an acquirer processor.

In block 310, the card and simulation server 110 generates an authorization response message. To do so, the card and simulation server 110 can locally simulate and/or emulate payment network processing. For example, in some embodiments, the card and simulation server 110 can locally apply payment logic to the authorization request message and generate an appropriate payment network response. As discussed, such logic and authorization response generation can be provided locally by the card and simulation server 110 without requiring communication with devices of a payment network. For example, the card and simulation server 110 can locally generate an authorization response message that includes one or more response codes indicating that an authorization request message corresponding to a test transaction is approved or denied. It should be appreciated that the authorization response message generated by the card and simulation server 110 can also indicate or include any other type of transaction message or code. The authorization response message can be generated in substantially the same format as the translated authorization request message. That is, the authorization response message can be generated in message format that corresponds to a payment network messaging standard.

Additionally, in some embodiments, the authorization response message can be generated based at least in part on, or otherwise as a function of, the test profile to which the test transaction corresponds. As discussed, in some embodiments, the test profile can include one or more test parameters (e.g., transaction amount, transaction type, payment card characteristics, etc.) or requirements that define the test transaction performed for a particular test scenario. As such, the content (e.g., messages, response codes, etc.) of the authorization response message may be based on the test parameters that define the test transaction for the particular test scenario.

In block 312, the card and simulation server 110 translates the authorization response message from a message formatted according to one messaging standard to a message formatted according to another messaging standard. For example, the card and simulation server 110 can translate the authorization response message from a message formatted according to the payment network messaging standard to a message formatted according to the acquirer processor messaging standard. As discussed above, in doing so, the card and simulation server 110 locally simulates and/or emulates processing by an acquirer processor.

In block 314, the card and simulation server 110 determines an outcome of the test transaction. For example, in some embodiments, the card and simulation server 110 determines whether the test transaction passed or failed based on the corresponding test profile, which as discussed, can include one or more test parameters (e.g., transaction amount, transaction type, payment card characteristics, etc.) that define the test transaction performed for a particular test scenario. To do so, in block 316, the card and simulation server 110 can analyze test log data 142 received from the payment card device 140 after completion of the test transaction. Additionally, the card and simulation server 110 can analyze test log data 122 locally captured by the card and simulation server 110 during the test transaction. As discussed, in some embodiments, the payment card device 140 and/or one or more applications executed by the payment card device 140 can be configured to cause the payment card device 140 to capture and store the log data 142 (e.g., transaction data, test results, etc.) during the test transaction. In such embodiments, the card and simulation server 110 can read, obtain, or otherwise receive the log data 142 from the payment card device 140. To do so, the card and simulation server 110 can receive the log data 142 from the card reader/writer 130 in response to the payment card device 140 being placed in contact with, or close proximity to, the card reader/writer 130. It should be appreciated that the card and simulation server 110 can receive the log data 142 from the payment card device 140 in any other suitable manner (e.g., wireless communication, physical communication, etc.). It should also be appreciated that although the card and simulation server 110 determines whether the test transaction passes or fails in the illustrative embodiment, the card and simulation server 110 can determine other outcomes for the test transaction, in other embodiments.

In block 318, the card and simulation server 110 generates an outcome report for the test transaction. The outcome report includes information indicative of the determined outcome of the test transaction. In some embodiments, the outcome report includes data indicative of the particular test profile or test scenario tested and the outcome of the corresponding test transaction. Additionally, in some embodiments, the outcome report can include data indicative of multiple test profiles and the outcome of each of the corresponding test transactions. It should be appreciated that in such embodiments, batch testing can be performed.

In block 320, the card and simulation server 110 transits the outcome report for the test transaction to a remote computing device for analysis. For example, in some embodiments, the card and simulation server 110 transmits the outcome report for the test transaction to the certification management server 172 of the acquirer processor environment 170. It should be appreciated that the card and simulation server 110 can transmit the outcome report to any other device of the acquirer processor environment 170 or a different environment of the system 100 remote to the merchant environment 102. It should be appreciated that by locally emulating and/or simulating acquirer processor processing and payment network processing, integrated circuit payment card terminals (e.g., POS devices, etc.) can be tested in a closed-loop environment, which may increase testing efficiency and speed. Such local emulation and simulation may also lower the cost associated with testing and certifying integrated circuit payment terminals with payment networks and acquirer processors.

Figure 4:
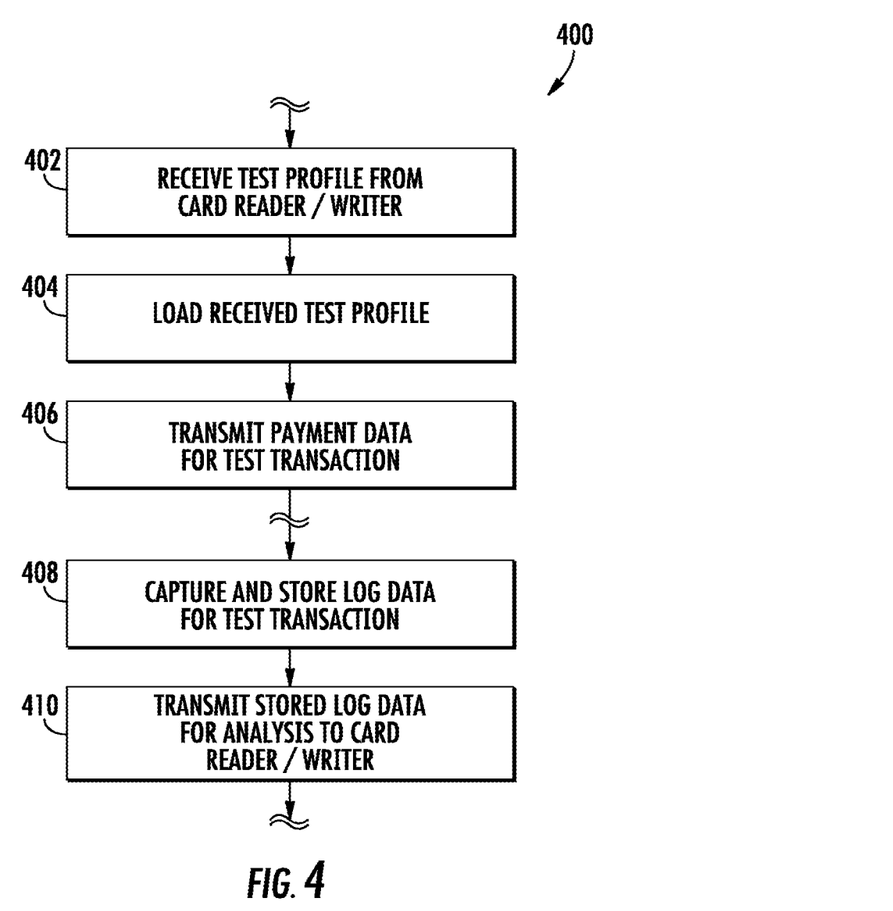
FIG. 4 is a simplified flow diagram of at least one embodiment of a method that may be executed by the payment card device of FIG. 1 for loading test profiles and capturing log data for test transactions.

Referring now to FIG. 4, a method 400 that may be executed by the payment card device 140 for loading test profiles and capturing log data for test transactions beings with block 402. In block 402, the payment card device 140 receives a test profile from the card reader/writer 130. To do so, the payment card device 140 can be brought into contact with, or in close proximity to, the card reader/writer 130. In response to being brought into contact with or close proximity to the card reader/writer 140, the test profile can be received via a short-range wireless communication channel. It should be appreciated, however, that the payment card device 140 can receive the test profile from the card reader/writer 130 via any other suitable communication technology (e.g., IEEE 802.11 wireless networks, point-to-point links, bus links, wires, cables, light guides, printed circuit board traces, etc.). As discussed, the test profile can include one or more test parameters or requirements (e.g., transaction amount, transaction type, payment card characteristics, etc.) that define a test transaction to be performed for a particular test scenario. Additionally, in some embodiments, the test profile can include one or more applications configured to capture and locally store the log data 142 when executed by the payment card device 140.

In block 404, the payment card device 140 loads the received test profile. To do so, the payment card device 140 can dynamically configure one or more parameters (e.g., bits, identification data, etc.) or configuration data associated with the payment card device 140. It should be appreciated that by loading different test profiles onto payment card device 140, the payment card device 140 can be configured to emulate any number of different types of payment card devices 140. In embodiments in which the received test profile includes an application, the application can be executed by a processor or other logic component of the payment card device 140. The application can be executed upon receipt of the test profile from the card reader/writer 130 or it can be executed when the payment card device 140 is brought into contact with, or close proximity to, the POS device 160.

In block 406, the payment card device 140 transmits payment data for a test transaction corresponding to the loaded test profile. For example, the payment card device 140 can transmit card data (e.g., payment card number, BIN number, expiration data, EMV data, etc.) for the test transaction. It should be appreciated that the payment card device 140 can transmit any other type of payment data, in other embodiments. The payment data can be transmitted in response to the card and simulation server 110, the merchant transaction server 150, the POS device 160, or any other device of the merchant environment 102 initiating the test transaction. Additionally or alternatively, the payment card device 140 can transmit the payment data in response to the payment card device 140 being placed in contact with, or within close proximity to, the POS device 160. For example, in embodiments in which the payment card device 140 is embodied as an EMV card, the payment card device 140 can transmit the payment data in response to an integrated circuit of the EMV payment card being placed within an EMV interface of the POS device 160.

In block 408, the payment card device 140 captures and stores log data 142 based at least in part on, or otherwise as a function of, the test transaction. In some embodiments, the log data 142 is captured and locally stored in a storage of the payment card device 140. The log data 142 includes transaction data (e.g., authorization request messages, authorization response messages, timestamps, bitmapped data fields, test results, etc.) generated locally by the payment card device 140, the POS device 160, the merchant transaction server 150, and/or the card and simulation server 110. For example, in embodiments in which the test profile includes one or more applications, the application(s), when executed by a processor or other processing logic of the payment card device 140, can capture and store the log data 142.

In block 410, the payment card device 140 transmits the stored log data 142 to the card reader/writer 130. The payment card device 140 can transmit the stored log data 142 in response to the payment card device 140 being placed into contact with, or in close proximity to, the card reader/writer 130. In some embodiments, the log data 142 locally stored in the storage of the payment card device 140 is transmitted to the card reader/writer 130 upon completion of the test transaction. As discussed above, the log data 142 can be analyzed by the card and simulation server 110 to determine an outcome of the test transaction. It should be appreciated that in some embodiments such outcome can be used to certify the POS device 160 (or other payment terminal) with an acquirer processor and/or a payment network.

In various embodiments disclosed herein, a single component can be replaced by multiple components and multiple components can be replaced by a single component to perform a given function or functions. Except where such substitution would not be operative, such substitution is within the intended scope of the embodiments.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method for closed-looped testing of integrated circuit device terminals in a first network environment, the method comprising:
    loading, by a data transfer simulation server of the first network environment, a test data transfer profile onto an integrated circuit device, wherein the test data transfer profile comprises test parameters defining a test data transaction to be processed in the first network environment;
    receiving, by the data transfer simulation server and from a merchant transaction server of the first network environment, a first authorization request message for the test data transaction, wherein the first authorization request message is generated by the merchant transaction server and corresponds to the test data transfer profile, and wherein the merchant transaction server is one of one or more integrated circuit device terminals in the first network environment;
    generating, by the data transfer simulation server, an authorization response message for the test data transaction based on the test data transfer profile;
    transmitting, by the data transfer simulation server, the authorization response message to the merchant transaction server of the first network environment;
    receiving, by the data transfer simulation server and from the integrated circuit device, test log data, wherein the test log data corresponds to the test data transaction and comprises the first authorization request message, the authorization response message, and timestamps associated with the first authorization request message and the authorization response message; and
    determining whether one or more integrated circuit device terminals may operate outside of the first network environment based on an analysis of the test log data.

2. The method of claim 1, further comprising:
    generating first test log data based upon the first authorization request message, wherein determining whether one or more integrated circuit device terminals may operate outside of the first network environment is based on an analysis of the test log data and/or first test log data.

3. The method of claim 1, wherein determining whether one or more integrated circuit device terminals may operate outside of the first network environment further comprises:
    determining, by the data transfer simulation server, an outcome of the test data transaction based on the test data transfer profile; and
    transmitting, by the data transfer simulation, an outcome report based on the outcome of the test data transaction.

4. The method of claim 3, wherein the outcome report is transmitted to a certification management server of a second network environment.

5. The method of claim 3, wherein determining the outcome of the test data transaction comprises:
    determining whether the test data transaction passed or failed by comparing one or more of a transaction amount, transaction type, and payment card characteristics of the test data transfer profile with data of the test log data.

6. The method of claim 1, wherein the first network environment is a closed-loop network environment.

7. One or more machine-readable storage media comprising a plurality of instructions stored thereon that in response to being executed by a data transfer simulation server of a first network environment, cause the data transfer simulation server execute a method comprising:

loading, in the first network environment, a test data transfer profile onto an integrated circuit device, wherein the test data transfer profile comprises test parameters defining a test data transaction to be processed in the first network environment;

receiving, from a merchant transaction server of the first network environment, a first authorization request message for the test data transaction, wherein the first authorization request message is generated by the merchant transaction server and corresponds to the test data transfer profile, and wherein the merchant transaction server is one of one or more integrated circuit device terminals in the first network environment;

generating an authorization response message for the test data transaction based on the test data transfer profile;

transmitting the authorization response message to the merchant transaction server of the first network environment;

receiving, from the integrated circuit device, test log data, wherein the test log data corresponds to the test data transaction and comprises the first authorization request message, the authorization response message, and timestamps associated with the first authorization request message and the authorization response message; and determining whether one or more integrated circuit device terminals may operate outside of the first network environment based on an analysis of the test log data.

8. The one or more machine-readable storage media of claim 7, wherein the method further comprises:

generating first test log data based upon the first authorization request message, wherein determining whether one or more integrated circuit device terminals may operate outside of the first network environment is based on an analysis of the test log data and/or first test log data.

9. The one or more machine-readable storage media of claim 7, wherein determining whether one or more integrated circuit device terminals may operate outside of the first network environment further comprises:

determining, by the data transfer simulation server, an outcome of the test data transaction based on the test data transfer profile; and transmitting, by the data transfer simulation, an outcome report based on the outcome of the test data transaction.

10. The one or more machine-readable storage media of claim 9, wherein the outcome report is transmitted to a certification management server of a second network environment.

11. The one or more machine-readable storage media of claim 9, wherein determining the outcome of the test data transaction comprises:

determining whether the test data transaction passed or failed by comparing one or more of a transaction amount, transaction type, and payment card characteristics of the test data transfer profile with data of the test log data.

12. The one or more machine-readable storage media of claim 7 wherein the first network environment is a closed-loop network environment.

13. A system for testing integrated circuit device terminals in a first network environment, comprising:

a data transfer simulation server of the first network environment comprising a processor executing instructions stored in memory, wherein the instructions cause the processor to execute a method comprising:

loading, in the first network environment, a test data transfer profile onto an integrated circuit device, wherein the test data transfer profile comprises test parameters defining a test data transaction to be processed in the first network environment;

receiving, from a merchant transaction server of the first network environment, a first authorization request message for the test data transaction, wherein the first authorization request message is generated by the merchant transaction server and corresponds to the test data transfer profile, and wherein the merchant transaction server is one of one or more integrated circuit device terminals in the first network environment;

generating an authorization response message for the test data transaction based on the test data transfer profile;

transmitting the authorization response message to the merchant transaction server of the first network environment;

receiving, from the integrated circuit device, test log data, wherein the test log data corresponds to the test data transaction and comprises the first authorization request message, the authorization response message, and timestamps associated with the first authorization request message and the authorization response message; and determining whether one or more integrated circuit device terminals may operate outside of the first network environment based on an analysis of the test log data.

14. The system of claim 13, wherein the method further comprises:

generating first test log data based upon the first authorization request message, wherein determining whether one or more integrated circuit device terminals may operate outside of the first network environment is based on an analysis of the test log data and/or first test log data.

15. The system of claim 13, wherein determining whether one or more integrated circuit device terminals may operate outside of the first network environment further comprises:

determining, by the data transfer simulation server, an outcome of the test data transaction based on the test data transfer profile; and transmitting, by the data transfer simulation, an outcome report based on the outcome of the test data transaction.

16. The system of claim 15, wherein the outcome report is transmitted to a certification management server of a second network environment.

17. The system of claim 15, wherein determining the outcome of the test data transaction comprises:

determining whether the test data transaction passed or failed by comparing one or more of a transaction amount, transaction type, and payment card characteristics of the test data transfer profile with data of the test log data.

18. The system of claim 13, wherein the first network environment is a closed-loop network environment.

* * * * *